(12) United States Patent
Vainikka et al.

(10) Patent No.: US 8,824,958 B2
(45) Date of Patent: Sep. 2, 2014

(54) RELAY NODE CONNECTION MANAGEMENT

(75) Inventors: Markku Juha Vainikka, Kiviniemi (FI); Vinh Van Phan, Oulu (FI)

(73) Assignee: Nokia Siemens Networks Oy, Espoo (FI)

( * ) Notice: Subject to any disclaimer, the term of this patent is extended or adjusted under 35 U.S.C. 154(b) by 541 days.

(21) Appl. No.: 12/919,502

(22) PCT Filed: Feb. 27, 2009

(86) PCT No.: PCT/EP2009/052371
§ 371 (c)(1),
(2), (4) Date: Sep. 8, 2010

(87) PCT Pub. No.: WO2009/106616
PCT Pub. Date: Sep. 3, 2009

(65) Prior Publication Data
US 2011/0003545 A1 Jan. 6, 2011

(30) Foreign Application Priority Data
Feb. 29, 2008 (FI) ...................................... 20085193

(51) Int. Cl.
*H04B 7/15* (2006.01)
*H04W 76/02* (2009.01)
*H04W 88/04* (2009.01)
*H04W 92/02* (2009.01)
*H04W 16/26* (2009.01)
*H04W 84/04* (2009.01)
*H04B 7/14* (2006.01)
*H04B 7/155* (2006.01)

(52) U.S. Cl.
CPC .............. *H04W 76/02* (2013.01); *H04W 88/04* (2013.01); *H04W 92/02* (2013.01); *H04W 16/26* (2013.01); *H04W 84/047* (2013.01); *H04B 7/14* (2013.01); *H04B 7/15528* (2013.01)
USPC ........................... 455/11.1; 455/13.1; 455/16

(58) Field of Classification Search
CPC ..... H04W 76/02; H04W 16/26; H04W 92/02; H04W 84/047; H04W 52/46; H04W 88/04; H04W 40/22; H04B 7/14; H04B 7/15528
USPC ................ 455/3.02, 427, 428, 430, 431, 7–9, 455/11.1, 12.1, 13.1, 13.2, 14–17; 340/425.1; 370/226, 293, 246, 274, 370/279, 315, 316, 492, 501
See application file for complete search history.

(56) References Cited

U.S. PATENT DOCUMENTS 5,504,935 A     4/1996    Vercauteren ................. 455/33.2
7,630,714 B2 * 12/2009    Clark et al. ................ 455/435.1

(Continued)

FOREIGN PATENT DOCUMENTS

CN        1901400 A      1/2007
CN        101111047 A     1/2008

OTHER PUBLICATIONS

Wei, Hung-Yu, et al., "Two-Hop-Relay Architecture for Next-Generation WWAN/WLAN Integration", Apr. 2004, IEEE Wireless Communications, 8 pgs.

(Continued)

*Primary Examiner* — Dominic E Rego
(74) *Attorney, Agent, or Firm* — Harrington & Smith

(57) ABSTRACT

Providing connections to terminals in an access node of a first network. A message is received in the access node from a terminal, the message including capability information of the terminal. The terminal is identified in the access node on the basis of the received capability information as an intermediary node capable of relaying traffic between the first network and a second network. Parameters for a connection between the access node and the terminal are determined in the access node on the basis of the identification of the terminal as intermediary node and used in establishing the connection between the access node and the terminal.

12 Claims, 3 Drawing Sheets

(56) References Cited

U.S. PATENT DOCUMENTS

| | | | |
|---|---|---|---|
| 7,675,914 B2* | 3/2010 | Hamamoto et al. | 370/392 |
| 7,933,549 B2* | 4/2011 | Larsson | 455/7 |
| 8,442,061 B2* | 5/2013 | Masuda | 370/401 |
| 2003/0048750 A1* | 3/2003 | Kobayashi | 370/229 |
| 2003/0139910 A1* | 7/2003 | Yamamoto et al. | 702/188 |
| 2004/0236831 A1* | 11/2004 | Ohto et al. | 709/204 |
| 2005/0135254 A1* | 6/2005 | Taylor et al. | 370/237 |
| 2005/0203682 A1* | 9/2005 | Omino et al. | 701/24 |
| 2006/0101118 A1* | 5/2006 | Yabe et al. | 709/206 |
| 2006/0264217 A1 | 11/2006 | Shaheen | 455/445 |
| 2006/0291417 A1* | 12/2006 | Aust et al. | 370/331 |
| 2007/0081479 A1 | 4/2007 | Kang et al. | 370/310 |
| 2007/0190998 A1* | 8/2007 | Tanaka et al. | 455/423 |
| 2007/0255784 A1* | 11/2007 | Takechi et al. | 709/203 |
| 2008/0043709 A1 | 2/2008 | Zhou et al. | 370/348 |
| 2008/0155250 A1* | 6/2008 | Tanizawa et al. | 713/152 |
| 2008/0172724 A1* | 7/2008 | Esaka et al. | 726/5 |
| 2008/0267385 A1* | 10/2008 | Provost et al. | 379/225 |
| 2009/0047936 A1* | 2/2009 | Kampmann et al. | 455/414.1 |

OTHER PUBLICATIONS

IEEE P802.16j/D1, Part 16: Air Interface for Fixed and Mobile Broadband Wireless Access Systems, IEEE WirelessMAN 802.16, IEEE Computer Society, IEEE Std 802.16-2007, Aug. 8, 2007.

Relay Task Group of IEEE 802.16: "Draft Amendment to IEEE Standard for Local and metropolitan area networks; Part 16: Air Interface for Fixed and Mobile Relay Specification; IEEE P802.16j/D2" [Online] Dec. 24, 2007, pp. I-XVI, 1-262, XP002531865, Retrieved from the Internet: URL:http://grouper.ieee.org/groups/802/16/private/darfts/relay/> [retrieved on Jun. 9, 2009].

3GPP TS 36.300 V8.2.0 (Sep. 2007) 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8).

Wei, H. et al.; "WWAN/WLAN Two-Hop-Relay Architecture for Capacity Enhancement"; Wireless Communications and Networking Conference, 2004; pp. 225-230; IEEE Communications Society.

* cited by examiner

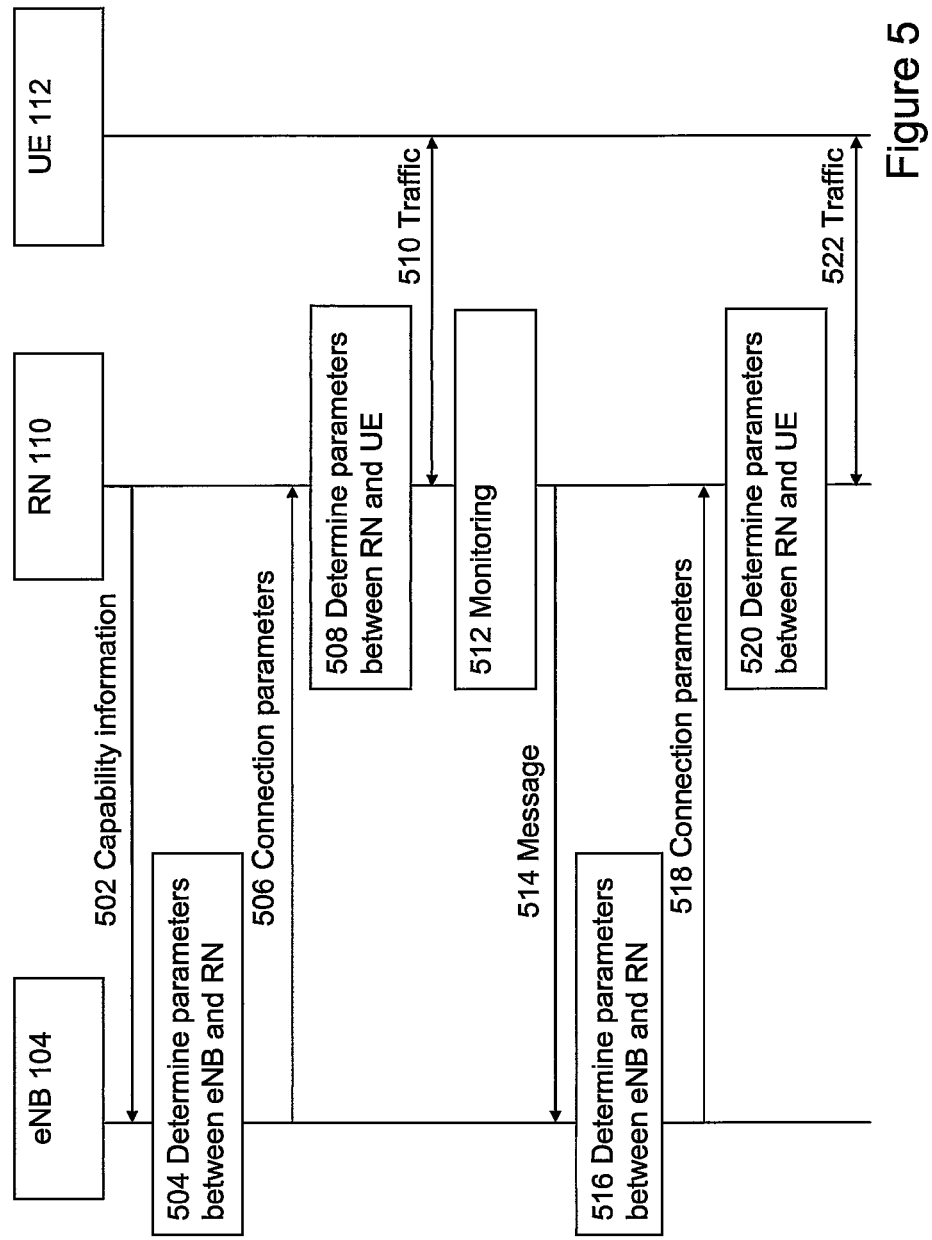

RELAY NODE CONNECTION MANAGEMENT

FIELD OF THE INVENTION

The present invention relates to accommodating relays in communication networks.

BACKGROUND OF THE INVENTION

Currently, mobile communication networks, such as 2G (2nd generation mobile communications) and 3G (3rd generation mobile communications) cellular communication networks, are widely available for people to make phone calls and access the Internet, for example. To access those services with UE (User Equipment), such as a mobile phone, a connection needs to be established between the network and UE. In order to establish and maintain connections between UE and the network, the networks apply connection management to the connections. In 3G network, for example, UEs connect to the network via RAN (Radio Access Network) part of the 3G network, which also performs the connection management tasks to the connections with UEs. The connections are managed for example by allocating resources and by defining transmission power levels, modulation and coding schemes to be used.

In 3GPP LTE (Long Term Evolution) development of UTRAN (Universal Terrestrial Radio Access Network) the possibility of introducing relays into the RAN has been considered. An overall description of E-UTRAN (Evolved UTRAN) radio access part of the LTE network is provided in TS 36.300 V8.2.0 (2007-09).

When relays are introduced into RAN, such as in E-UTRAN, there are many relaying options and system alternatives to be considered: amplify-and-forward or decode-and-forward type of relays; fixed or mobile relays; single-hop or multi-hop relays; tree or mesh topologies; cooperative or non-cooperative relays; single RAT (Radio Access Technology) or multi-RAT relays. In different usage scenarios for relays, the technologies used in relay nodes may vary. In a relaying scenario with multi-RAT relays, the relays employ several RATs, as one RAT system is relayed over another serving RAT system such as E-UTRAN. An example of multi-RAT relaying is a scenario, where the relayed RAT system over a serving cellular RAT system is WLAN (Wireless Local Area Network) offering high-speed local connectivity or Bluetooth® providing slower connection with less distance. Therefore, as relays may employ different technologies with different numbers of connecting UEs, relays may introduce a very high traffic load to the serving network. Consequently, the requirements of the connection between a relay and a network are different than those of the connection between a regular UE device not operating as a relay and a serving network.

When relays are deployed to communication networks, they connect devices indirectly to the network. To enable relaying for the indirectly connected devices, the connection of the relay to the communication network is shared between the devices connecting to the relay. The current connection management in communication networks, however, only takes into consideration the status and control information obtained from the connections of UE devices directly connected to the network, such as connections between UEs and access nodes in the network. However, information from the connections between relays and devices connecting to relays is not currently considered in the connection management of communication networks. This may result in non-optimal connection management between relays and the network, and relays and devices, for example in terms of resource allocation. This may especially apply to configurations that involve mobile relays that connect to the network via air-interface.

BRIEF DESCRIPTION OF THE INVENTION

An object of the present invention is to provide a method, apparatus and computer program product so as to alleviate the above disadvantages in relay connections. The objects of the invention are achieved by a method and an arrangement, which are characterized by what is stated in the independent claims. The preferred embodiments of the invention are disclosed in the dependent claims.

The invention is based on the idea of identifying an intermediary node on the basis of the capability information received from the intermediary node.

An advantage of the method and arrangement of the invention is that the identification of the intermediary nodes in networks is enabled by using the information received in capability information messages, thus without dedicated signalling for identification purposes.

Another advantage of the method and arrangement of the invention is that the connection parameters for a connection to an intermediary node can be set on the basis of the identification of the intermediary node.

Further advantages of embodiments of the invention will become apparent from the description below.

BRIEF DESCRIPTION OF THE DRAWINGS

In the following the invention will be described in greater detail by means of preferred embodiments with reference to the accompanying drawings, in which

FIG. 5 shows a signalling chart according to an embodiment of the invention.

DETAILED DESCRIPTION OF THE INVENTION

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments.

In the following the invention is described employing the context and terminology used in LTE E-UTRAN (Evolved Universal Terrestrial Radio Access Network) as defined in 3GPP TS 36.300 V8.2.0 (2007-09), although the invention can be applied to other networks and technologies, such as GSM (Global System for Mobile Communications), WCDMA (Wideband Code Division Multiple Access), IEEE (Institute of Electrical and Electronics Engineers) 802.16, WLANs (Wireless Local Area Network) or Bluetooth® standards, or any other suitable standard/non-standard wireless communication means.

Figure 1:
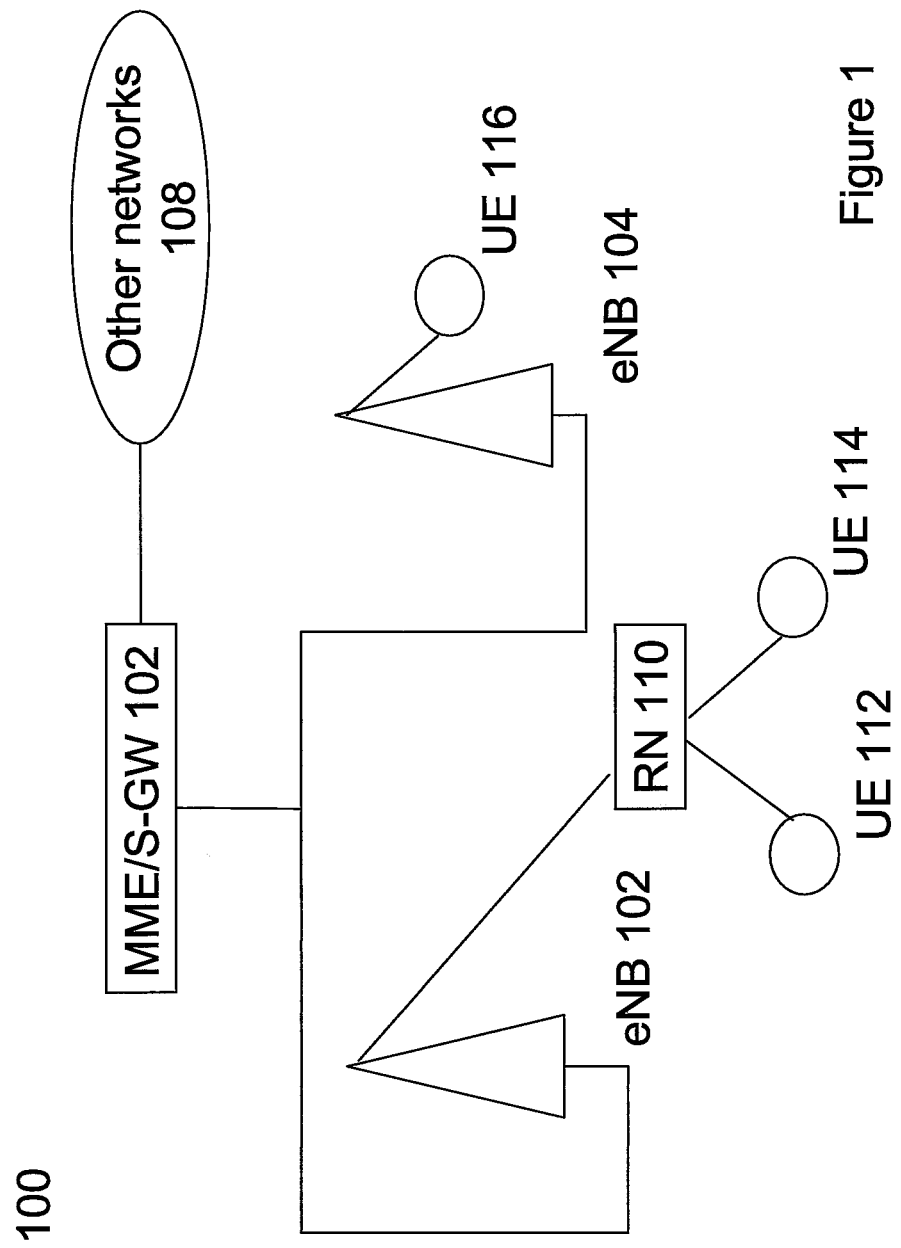
FIG. 1 is shows an example of a communications network according to an embodiment of the invention.

A general architecture of a communication system employing relays is illustrated in FIG. 1. FIG. 1 is a simplified system architecture only showing some elements and functional entities, all being logical units whose implementation may differ from what is shown. The connections shown in FIG. 1 are logical connections; the actual physical connections may be different. It is apparent to a person skilled in the art that the systems also comprise other functions and structures.

FIG. 1 illustrates an LTE E-UTRAN network 100 employing relaying according to an embodiment of the invention. MME (Mobility Management Entity) handling control plane signalling and S-GW (Serving Gateway) processing userplane data in LTE E-UTRAN can reside in a single node in the network or in separate nodes. In FIG. 1, an implementation is shown where MME and S-GW are implemented in a single network node MME/S-GW 102 that provides for example mobility management in the network. The network of FIG. 1 provides radio signal coverage using access nodes, such as eNBs 102 and 104, as in LTE E-UTRAN, enabling wireless access for UEs 112, 114 and 116. UE may be for example a mobile phone or terminal or any apparatus capable of accessing and operating in a network.

In the network 100, Relay Node (RN) 110 represents an intermediary node that relays traffic between eNB and one or more apparatuses, such as UEs, connecting to RN. RNs may be deployed, for example, to extend the coverage of the network. In the present embodiment RN may be implemented as UE that comprises necessary extensions for relaying traffic, such as additional communication means. UE operating as RN may be connected to eNB via a wide area wireless connection. UEs, such as 112 and 114 in FIG. 1, may access the network 100 via RN 110 connecting to eNB 102. When accessing the network, UEs may gain access to other networks 108, such as the Internet and services provided therein.

In the network of FIG. 1, eNBs connect RNs to the radio access network, such as in LTE E-UTRAN, that in this embodiment is a serving network for RN. The serving network provides RN mobile access to the communications network. RN in turn, provides access to one or more UEs, for example via WLAN. Consequently, RN is connected to a serving network and a relayed network and serves as an access point to UEs.

In an embodiment of the present invention RN may be UE operating as an intermediary node providing access to other UEs. An exemplary usage scenario for such RN is in a long-haul bus, where RN is configured to communicate with eNB according to LTE E-UTRAN specifications. Accordingly, as an intermediary node, RN shares its connection to eNB with one or more UEs by providing to UEs another type of access using, for example, WLAN technology as defined by IEEE (Institute of Electrical and Electronics Engineers) in 802.11 family of standards. Also other communication technologies may be used in RN for providing access, such as Bluetooth®, infrared and UWB (Ultra Wide Band) technologies. Consequently, RN may be connected to a serving network, such as LTE E-UTRAN, and also to a relayed network, such as WLAN for connecting one or more UEs to LTE E-UTRAN. As an intermediary node, RN may relay traffic between the networks, thus between eNB and UE. Accordingly, RN may be configured to receive and transmit traffic, such as messages, so as to connect to eNB and provide access to UE, facilitating for example Internet connections for UE in the long-haul bus. Advantageously, the connection resources allocated by eNB for the connection to RN may be shared between UEs connecting to RN, improving the utilization rate of the connection compared to that of only single apparatus connecting to eNB. Another advantage of the above scheme is that functions provided by the serving network, such as mobility management, is necessary to perform only to RN instead of all UEs separately.

Figure 2:
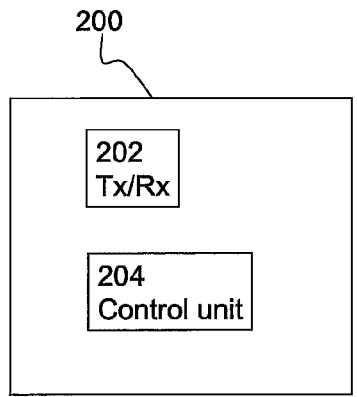
FIG. 2 shows an apparatus for implementing an embodiment of the invention.

FIG. 2 shows a simplified structure of an apparatus 200 configured according to an embodiment of the invention. The apparatus may be for example an access node 102, 104 providing access in the network 100 or a relay node (RN) 110 operating as an intermediary node between UE and eNB in FIG. 1. The apparatus in FIG. 2 comprises means for establishing connections to other devices in a transceiver (Tx/Rx) unit 202 using, for example, one or more of the communications technologies explained above. The connections may be duplex, half-duplex or simplex and carry traffic, such as messages either in downlink or uplink. Thus, the Tx/Rx unit may provide means for transmitting and means for receiving data, packets or messages on the connections. The apparatus also comprises control means implemented in a control unit 204 for controlling the operation of the one or more Tx/Rx units and performing processing to the messages received by the Tx/Rx unit in order for the apparatus to function as an access node or relay node according to the present invention. Although the apparatus has been described as one entity, different modules and memory may be implemented in one or more physical or logical entities. Accordingly, the units in the apparatus may be implemented in separate units or in a single functional transceiver or control units. The functioning of the apparatus according to the present invention is explained in more detail in the description associated with the accompanying figures showing the methods and signalling according to the present invention.

In an embodiment of the invention the apparatus in FIG. 2 is a portable computing device. Such computing devices include wireless mobile communication devices operating with or without a subscriber identification module (SIM), including, but not limited to, the following types of devices: mobile phone, smartphone, personal digital assistant (PDA), handset, mobile stations and user equipment (UE).

The apparatus 200 may be implemented as an electronic digital computer, which may comprise a working memory (RAM), a central processing unit (CPU), and a system clock. The CPU may comprise a set of registers, an arithmetic logic unit, and a control unit. The control unit is controlled by a sequence of program instructions transferred to the CPU from the RAM. The control unit may contain a number of microinstructions for basic operations. The implementation of microinstructions may vary, depending on the CPU design. The program instructions may be coded by a programming language, which may be a high-level programming language, such as C, Java, etc., or a low-level programming language, such as a machine language, or an assembler. The electronic digital computer may also have an operating system, which may provide system services to a computer program written with the program instructions.

An embodiment provides a computer program embodied on a distribution medium, comprising program instructions which, when loaded into an electronic apparatus, constitute the Tx/Rx unit 202 and the control unit 204 described earlier.

The computer program may be in source code form, object code form, or in some intermediate form, and it may be stored in some sort of carrier, which may be any entity or device capable of carrying the program. Such carriers include a record medium, computer memory, read-only memory, electrical carrier signal, telecommunications signal, and software distribution package, for example. Depending on the processing power needed, the computer program may be executed in a single electronic digital computer or it may be distributed amongst a number of computers.

The Tx/Rx unit 202 and the control unit 204 may also be implemented as one or more integrated circuits, such as application-specific integrated circuits ASIC. Other hardware embodiments are also feasible, such as a circuit built of separate logic components. A hybrid of these different implementations is also feasible. When selecting the method of implementation, a person skilled in the art will consider the requirements set for the size and power consumption of the apparatus 200, necessary processing capacity, production costs, and production volumes, for example.

Figure 3:
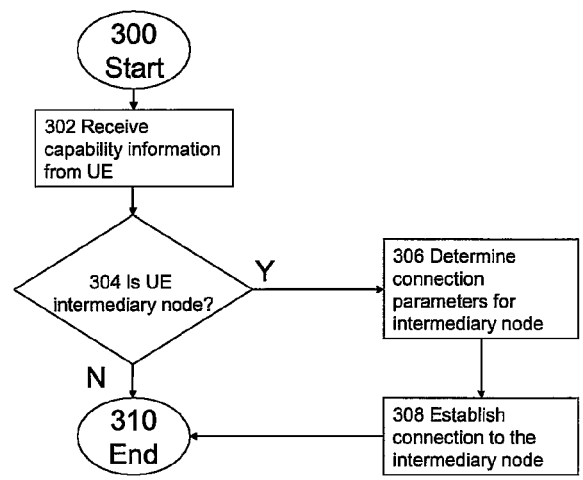
FIG. 3 shows a flow chart according to an embodiment of the invention.

FIG. 3 shows functional steps according to an embodiment of the invention performed by an access node embodied for example in the apparatus of FIG. 2. The access node may be eNB in the LTE E-UTRAN network, such as eNB 102 in the network 100 of FIG. 1. The access node may be configured to provide access to apparatuses, such as RN 110 accessing the network via eNB, in FIG. 1. In FIG. 3, the method starts at 300. In 302 eNB receives capability information from an apparatus accessing the LTE E-UTRAN, such as UE or RN. The capability information defines the limits of the one or more connection parameters on the connections with the apparatus. The capability information may be received in eNB for example in the connection establishment phase with the apparatus, when the apparatus is accessing the network, or during a connection with the apparatus. The capability information may also be received in response to a request for such information transmitted from eNB to the apparatus.

In 304, it is checked in eNB if the apparatus is an intermediary node, such as RN. eNB identifies the apparatus as RN on the basis of the received capability information. The capability information comprises one or more information elements (IEs) specifying the capabilities of the apparatus. The IEs may be of different lengths, such as one or more bits or bytes. eNB may identify the apparatus as RN, if the received capability information comprises RN specific capability information. For example, the capability information may comprise an IE defining the class of the apparatus to be RN class. The RN specific capability information may also be the following information for relaying, for example: available radio technologies, operation modes of the radio technologies used, supported power levels, supported data rates, supported modulation methods, supported services and scheduling restrictions for resources in time, frequency, code or space domain, etc. The received capability information may also comprise other capability information than the RN specific capability information. Advantageously, with the checking made as above, in 304 eNB may recognize UEs, that belong to the class of UEs capable of operating as intermediary nodes.

In 306, connection parameters are determined in eNB for the connection between RN and eNB. The connection parameters may be determined separately or combined for the uplink and downlink connections. The connection parameters define the configuration of the communication resource used for a connection between eNB and RN. The connection parameters may define the amount of allocated resources, scheduling of the resources, modulation methods to be used and data rates for example. eNB may determine the connection parameters on the basis of UE capability information, provided by RN, here referred to as RN capability information.

In an embodiment of the invention, the connection parameters are determined in 306 of FIG. 3, on the basis of the RN specific capability information. Typically, information about the technology used in the relayed network is applied in determining the connection parameters. A default setting of connection parameters specific for the type of relayed network may be applied, or relayed network status information may be used for determining the connection parameters. For example, when eNB identifies WLAN as the technology used in the relayed network, eNB determines the connection parameters on the basis of the WLAN network status information or uses default parameters for relayed WLAN stored in eNB. Accordingly, eNB may determine, for example, connection parameters defining the resources on the connection between eNB and RN, based on the relayed technology used. Also status information may be used together with the capability information to determine connection parameters, as explained below in more detail.

As discussed above, eNB may also determine connection parameters in 306 of FIG. 3, on the basis of the status information. eNb may receive status information of a connection in a message from RN. The status information comprises information on one or more attributes of transmitted or received traffic on a connection. Initial connection parameters for a connection to RN may have already been determined on the basis of the RN capability information. Consequently, the received status information for the connection may be used in determining new connection parameters for the existing connection. The received status information in eNB may comprise status information on the connection between eNB and RN and status information on the connection of RN to the relayed network, such as WLAN. The status information may comprise metrics, such as buffer status, one or more channel quality indicators, congestion, throughput, data rates used and number of users in the relayed WLAN. The channel quality indicator may define the channel quality in terms of signal measurements, bit-error rates, block error rates or packet error rates, etc. The status information may be for both uplink and downlink and for different connections separately and include information on the connections between eNB and RN as well as between RN and UE.

On the basis of the received status information, eNB may determine changes in the connection parameters of the connection between eNB and RN. The changes may be, for example, an increase or a decrease in the resources allocated for the connection between eNB and RN on the basis of the received status information. The resources may be for example transmission power, resources in time, frequency, code or space domain that are allocated on a communication medium. Status information, such as buffer status information, may indicate that the RN buffer for the connection to eNB is full and packets are lost due to buffer overflow. This may be the case if the relayed uplink traffic amount is too high for the allocated resources in uplink between eNB and RN. In such a case connection resources may be increased in eNB for the uplink between eNB and RN. On the other hand buffer status information may be used as an indication of inefficient use of resources on the connection, and thus as an indicator to decrease the allocated resources. Accordingly, the received status information may be used in eNB to determine changes needed in the connection parameters between eNB and RN such that the connection between eNB and RN takes into consideration the requirements and traffic that result from RN operating as an intermediary node and providing access to one or more UEs. An advantage of determining the connection parameters between the serving network and an intermediary node on the basis of status information received from the intermediary node is that the relayed network connection may be more dynamically adjusted to the existing traffic.

In an embodiment of the invention eNB may receive a request message from RN. The request message is a message indicating that changes would be needed in the connection parameters of a connection, for example the connection between eNB and RN. The request message may also be an implicit request message, which is interpreted in eNB as a request message. An example of such a message is a message comprising status information, as described above. After receiving the request, eNB determines new parameters for the connection between eNB and RN, as in step 306 of FIG. 3. The request message may be only a trigger to eNB causing eNB to determine new parameters. In such a case eNB determines new parameters on the basis of the RN capability information. If the request message comprises information on new parameters or an indication of one or more connection parameters that should be changed, eNB may use this information together with RN capability information to determine whether the request can be accepted. More specifically, eNB determines whether the new parameters received in the request message are acceptable. This may involve ensuring that it is possible to establish a connection according to the received parameters and ensuring that the requested parameters are within limits defined in RN capability information.

The requested changes may be, for example, increasing or decreasing the resources in the connection, or changing the scheduling of the connection between eNB and RN. The request may also be for changing the scheduling of resources between eNB and RN in order to arrange data reception and transmission times in RN according to the requirements of the technology used in the relayed network. The request may also be due to the characteristics of the services that are relayed by RN, for example real-time services. Such a service may be for example VoIP (Voice over Internet Protocol), which conventionally has requirements taking delay, delay variation and packet losses into consideration.

eNB may use any of the above means for determining the connection parameters separately or in combination, for example. In addition to the requested changes, the request message may also comprise status information, as in above embodiments. In such a case, eNB may determine the connection parameters on the basis of the information received in the request message and status information. An advantage of an intermediary node requesting changes in the connection parameters to the serving network is that the serving network is notified to take action to change the connection parameters, and this way, to improve the relayed network connection.

In 308 of FIG. 3, the connection is established between eNB and RN using the determined connection parameters. The specific methods and procedures used in connection establishment may vary depending on the used technology and are, as such, irrelevant to the actual invention. Connection establishment is a well-known procedure to a person skilled in the art and is not explained here in more detail. The process ends in 310, when the connection is established or the RN is not identified in step 304.

Figure 4:
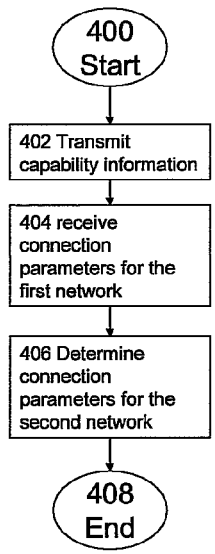
FIG. 4 shows a flow chart according to an embodiment of the invention.

FIG. 4 shows functional steps according to an embodiment of the present invention, performed by RN embodied for example in an apparatus, as the one shown in FIG. 2. Accordingly, RN may operate so as to receive messages on one connection and transmit at least part of the received messages on another connection. Therefore, RN may connect to serving and relayed networks to provide relaying. The connections may be of different types, such as of different technologies. The connections may be implemented for example by using LTE E-UTRAN and WLAN or other technologies discussed above. Consequently, RN may connect one or more apparatuses in WLAN to relay traffic between the apparatuses and LTE E-UTRAN. An example of RN in its operating environment is the node 110 in FIG. 1.

The process in FIG. 4 starts at 400. In 402 RN transmits its UE capability information to an access node, such as eNB in an LTE E-UTRAN network. This may happen for example in initial connection establishment or during a connection. The transmission of capability information may be explicitly requested by a request message from eNB, or it may be triggered within RN by changes needed in the parameters of an existing connection to eNB. The capability information comprises the information as explained in FIG. 3 and its associated description. In 404, RN receives connection parameters for the serving network connection, thus for the connection between eNB and RN. The parameters are determined by eNB, as explained in FIG. 3 and its associated description. RN uses the received connection parameters to establish a new connection or applies the connection parameters to an existing connection to the serving network.

In 406, RN determines relayed network connection parameters. The relayed network connection parameters define how RN and the relayed network, such as RN and UE, communicate on a connection between them. The relayed network parameters may be for example WLAN network parameters. The connection parameters received from eNB define the connection to the serving network, in this case LTE E-UTRAN. The connection between RN and LTE E-UTRAN is then used by relayed network traffic when connecting to the other networks. Consequently, the connection parameters between RN and the serving network also define the relayed network connection to the serving network. For example, an increase in the allocated resources on the connection between LTE E-UTRAN and RN allows an increased amount of traffic on the connection, and thus the relayed network traffic may be increased. Therefore, on the basis of the connection parameters between RN and LTE E-UTRAN or changes on them, connection parameters between RN and the relayed network, such as WLAN, may also be determined. Accordingly, WLAN parameters such as data rate, buffer size, number of connecting UE, resource allocation and scheduling related parameters may be determined on the basis of the received serving network connection parameters. Examples of serving network connection parameters to be used in determining WLAN parameters are the amount of allocated resources, scheduling of the resources, modulation methods to be used and data rates. In 408, the process ends.

Alternatively, RN may monitor the effect of the new parameters between eNB and RN in the status information of its connections to the serving network and the relayed network. Then, in 406 the monitored status information or its changes are used to determine connection parameters for a connection between RN and UE. An advantage of the above process of determining the relayed network parameters on the basis of the serving network connection is that the traffic in the relayed network can be accommodated according to the present connection to the serving network.

FIG. 5 shows a signalling chart according to the present invention for example in the network of FIG. 1. The signalling between apparatuses according to FIG. 5 may take place when the apparatuses are configured to perform the functional steps presented in FIGS. 3 and 4. The signalling chart shows the transmitted messages when RN 110 operates as an intermediary node between UE 112 and eNB 102. For example, RN operates as relay connecting with eNB using LTE E-UTRAN technology and with UE using WLAN. In such a scenario, RN provides UE a connection to the overlaying networks, such as network 108 in FIG. 1. Referring back to FIG. 5, in 502 RN transmits its UE capability information to eNB. In 504, eNB determines connection parameters for the connection between eNB and RN. In 506, eNB transmits the determined parameters for the connection to RN. RN applies the parameters for the connection between eNB and RN. In 508, RN determines connection parameters for the connection to UE on the basis of the connection parameters of the connection between eNB and RN. In 510, traffic between RN and UE is transmitted and received as defined by the determined parameters. In 512, RN monitors the traffic. In an embodiment of the invention the monitoring comprises monitoring the status of the connections to eNB and UE and obtains status information, as explained in the above embodiments. The status information may be monitored both in uplink and downlink and for different connections separately.

In an embodiment of the invention, in 514 RN transmits to eNB a message comprising the status information determined by monitoring the serving network and relayed network connections in 512. According to an alternative embodiment of the invention RN determines in 512, in addition to monitoring, if changes are needed in the connection parameters to eNB. The changes may be needed for example, when one or more of the values of the monitored parameters exceed or go below a threshold value, specified in RN. For example, on the basis of the monitoring, RN may determine that more resources are needed on the connection to eNB, or the power level of the connection needs to be increased so as to provide higher connection quality and data rates. On the basis of the determination, RN transmits in 514 a message to eNB, the message comprising a request for the determined changes in the connection parameters. The request message may in addition comprise the status information obtained in 512. The request message may also be, an implicit request message that is interpreted in eNB as a request message. Accordingly, the message comprising status information, as above, may be interpreted in eNB as a request for changes in the connection parameters.

In 516, the eNB determines new connection parameters for the connection to RN on the basis of the message received in 514, and transmits the new connection parameters in 518 to RN. In 520, RN determines new connection parameters for the connection to UE on the basis of the new parameters received in 518, and in 522 traffic is transmitted and received between RN and UE, as defined by the parameters determined in RN.

In steps 520 or 508 RN may in addition use status information obtained by monitoring its connections to the serving network and the relayed network to determine the parameters of the connection between RN and UE. In this way the effect of connection parameters, received and applied to the connection between eNB and RN, is observed in the status information and the monitored status information may be used in determining parameters for the connection between RN and UE.

The steps/points, signaling messages and related functions described above in FIGS. 2 to 5 are in no absolute chronological order, and some of the steps/points may be performed simultaneously or in an order differing from the given one. Other functions can also be executed between the steps/points or within the steps/points and other signaling messages sent between the illustrated messages. Some of the steps/points or part of the steps/points can also be left out or replaced by a corresponding step/point or part of the step/point. The access node and intermediary node operations illustrate procedures that may be implemented in one or more physical or logical entities. The signaling messages are only exemplary and may even comprise several separate messages for transmitting the same information. In addition, the messages may also contain other information.

The present invention is applicable to any user terminal, access node, server, corresponding component, and/or to any communication system or any combination of different communication systems that support relaying. The communication system may be a fixed communication system or a wireless communication system or a communication system utilizing both fixed networks and wireless networks. The protocols used, the specifications of access nodes, communication systems, servers and user terminals, especially in wireless communication, develop rapidly. Such development may require extra changes to an embodiment. Therefore, all words and expressions should be interpreted broadly and they are intended to illustrate, not to restrict, the embodiment.

It will be obvious to a person skilled in the art that, as the technology advances, the inventive concept can be implemented in various ways. The invention and its embodiments are not limited to the examples described above but may vary within the scope of the claims.

The invention claimed is:

1. A method comprising:
   transmitting capability information to the first network for identifying the terminal as an intermediary node for relaying traffic between the first network and a second network,
   receiving a message from the first network comprising connection parameters defining a connection to the first network for the terminal, and
   determining second connection parameters in the terminal for the connection to the second network on the basis of the received parameters.

2. A method according to claim 1, comprising:
   monitoring the relayed traffic between a first network and a second network,
   determining, on the basis of the monitoring, status information,
   transmitting a message to the first network comprising the status information, and
   determining second network connection parameters in the terminal on the basis of first network connection parameters received from the first network in response to the transmitted status information.

3. A method according to claim 2, wherein the status information comprises at least one metric from the group comprising: buffer status, channel quality indicator, congestion, throughput, data rate and number of users.

4. A method according to claim 1, comprising:
   monitoring the relayed traffic between a first network and a second network,
   determining, on the basis of the monitoring, status information,
   determining, on the basis of the status information, changes in the parameters of the connection to the first network,
   requesting the changes in a message to the first network, and
   determining second network connection parameters in the terminal on the basis of first network connection parameters received from the first network in response to the request.

5. A method according to claim 1, wherein the capability information comprises at least one intermediary node specific information from the group comprising: terminal class, available radio technologies, operation modes of the radio technologies, supported power levels, supported data rates, supported modulation methods, supported services and scheduling restrictions for resources in time, frequency, code or space domain.

6. An apparatus, comprising:
one or more processors; and
one or more memories including computer program code;
the one or more memories and the computer program code configured, with the one or more processors, to cause the apparatus to perform at least the following:
  transmit capability information to the first network for identifying the terminal as an intermediary node for relaying traffic between the first network and a second network,
  receive a message from the first network comprising connection parameters defining a connection to the first network for the terminal, and
  determine second connection parameters in the terminal for the connection to the second network on the basis of the received parameters.

7. An apparatus according to claim 6, the one or more memories and the computer program code configured, with the one or more processors, to further cause the apparatus to:
  monitor the relayed traffic between a first network and a second network,
  determine, on the basis of the monitoring, status information,
  transmit a message to the first network comprising the status information, and
  determine second network connection parameters in the terminal on the basis of first network connection parameters received from the first network in response to the transmitted status information.

8. An apparatus according to claim 7, wherein the status information comprises at least one metric from the group comprising: buffer status, channel quality indicator, congestion, throughput, data rate and number of users.

9. An apparatus according to claim 6, the one or more memories and the computer program code configured, with the one or more processors, to further cause the apparatus to:
  monitor the relayed traffic between a first network and a second network,
  determine, on the basis of the monitoring, status information,
  determine, on the basis of the status information, changes in the parameters of the connection to the first network,
  request the changes in a message to the first network, and
  determine second network connection parameters in the terminal on the basis of first network connection parameters received from the first network in response to the request.

10. An apparatus according to claim 6, wherein the capability information comprises at least one intermediary node specific information from the group comprising: terminal class, available radio technologies, operation modes of the radio technologies, supported power levels, supported data rates, supported modulation methods, supported services and scheduling restrictions for resources in time, frequency, code or space domain.

11. A computer program product embodied on a distribution medium, comprising program instructions which, when loaded into an electronic apparatus, cause the apparatus to: transmit capability information to the first network for identifying the terminal as an intermediary node for relaying traffic between the first network and a second network, receive a message from the first network comprising connection parameters defining a connection to the first network for the terminal, and determine second connection parameters in the terminal for the connection to the second network on the basis of the received parameters.

12. A computer program product according to claim 11, causing the apparatus to:
  monitor the relayed traffic between a first network and a second network,
  determine, on the basis of the monitoring, status information,
  transmit a message to the first network comprising the status information, and
  determine second network connection parameters in the terminal on the basis of first network connection parameters received from the first network in response to the transmitted status information.

* * * * *